Jan. 22, 1924. 1,481,446
C. R. WELSH
WINDPROOF SHIELD FOR MATCH BOXES
Filed April 10, 1923  2 Sheets-Sheet 2
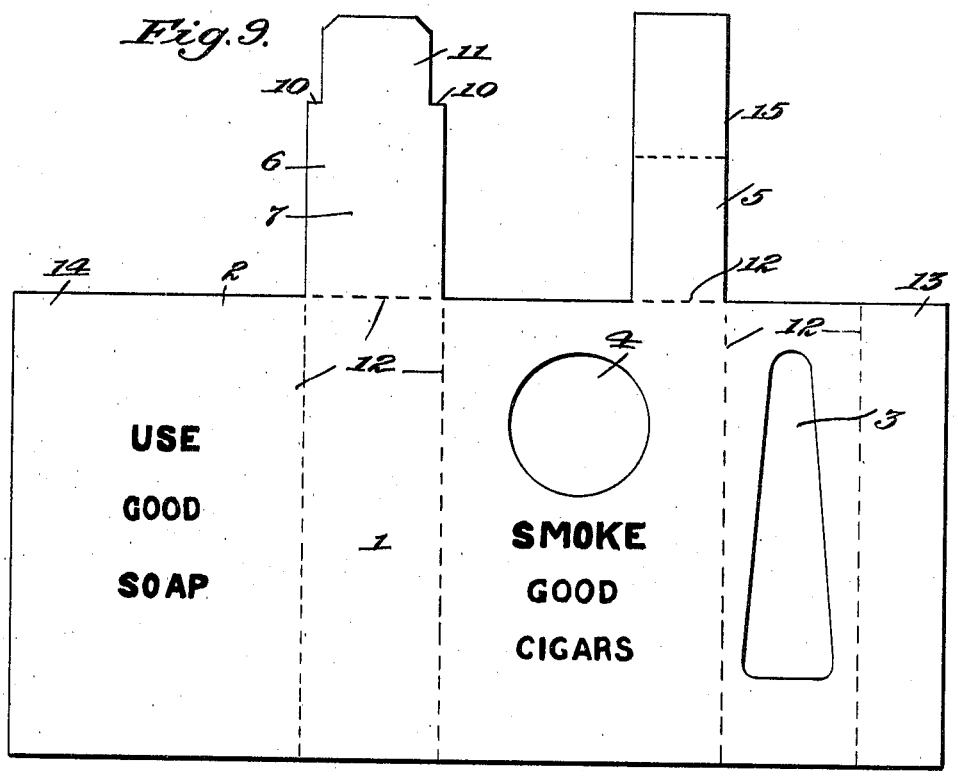
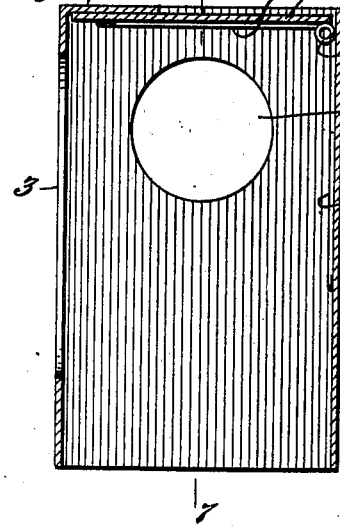
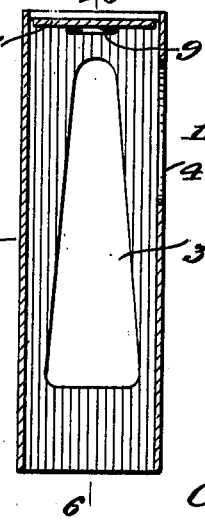
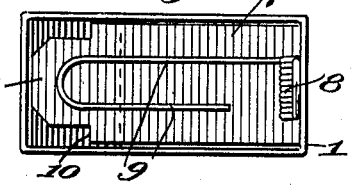
Inventor:
Charles R. Welsh,
by Joseph W. Harris
Atty.

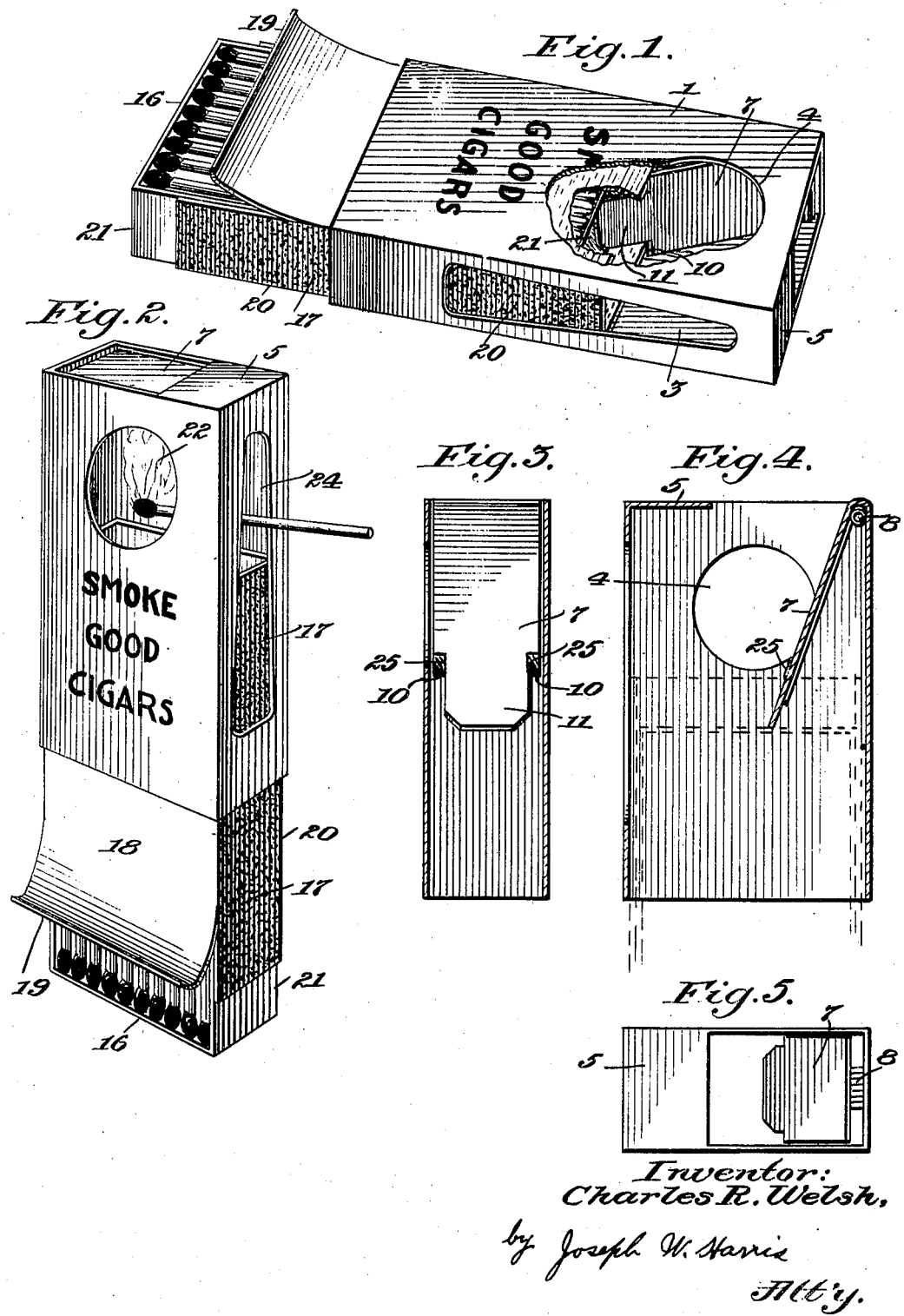

Patented Jan. 22, 1924.

1,481,446

UNITED STATES PATENT OFFICE.

CHARLES R. WELSH, OF SCHOFIELD BARRACKS, TERRITORY OF HAWAII.

WINDPROOF SHIELD FOR MATCH BOXES.

Application filed April 10, 1923. Serial No. 631,198.

*To all whom it may concern:*

Be it known that I, CHARLES R. WELSH, a citizen of the United States, and residing at Schofield Barracks, Territory of Hawaii, have invented certain new and useful Improvements in Windproof Shields for Match Boxes, of which the following is a specification.

This invention relates to covers for match boxes, which serve as wind proof shields, that will shield the flame of a lighted match from the wind and permit the comfortable lighting of a cigar.

An object of the invention is to provide a protecting wind shield for a lighted match, that will facilitate the lighting of cigars or cigarettes in the open while the wind is blowing.

A further object is to provide a wind shield that will frictionally retain a box of matches;

A further object is to provide a wind shield upon which may be printed advertising;

A further object is to provide a windshield that will at least last until all of the matches in the box have been used;

A further object is to provide a wind shield which when ready for use contains a chamber for the lighted end of the match;

A further object is to provide a wind shield which will open the match box upon pressure;

A further object is to provide a wind shield that may be cheaply made and thrown away when the matches contained in one box are used up.

A further object is to provide a wind shield that practically does not take up any more space in the pocket than the box of matches;

Other objects will appear on reading the specification.

In the accompanying drawings, Fig. 1 is a perspective showing the match box ejected, and the "opener" pressed down against the box cover and inner box;

Fig. 2 is a perspective showing a flaming match in the flame chamber, and having the "opener" closed;

Figs. 3 and 4 are longitudinal sections showing the "opener" depressed;

Fig. 5 is an end view showing the "opener" depressed;

Figs. 6 and 7 are longitudinal views showing the "opener" closed, on the lines 6—6, and 7—7, respectively;

Fig. 8 is a transverse section showing the inside view of the "opener" when closed; and Fig. 9 is a plan view of a blank from which the wind shield is made.

In Fig. 1 the case 1 is made from blank 2 shown in Fig. 9, and may be made of card board, such as "pressed board," or of a suitably treated card board, for example, treated with sodium silicate, or sodium tungstate, to render it less combustible; or it may be made of sheet metal for example, sheet tin, brass, aluminum, etc. Before the blank is folded and secured together, appropriate advertising matter, or theatre programs, etc., are printed or stamped thereon. The blank 2 is provided with a match igniting opening 3, and also a cigar lighting aperture 4. From the face part of the blank 2 extends the portion 5 which when assembling, is folded over one end and suitably secured as in box making forming a spacing and stiffening end for the case, and also an abutment or back stop for the hinged box-opener.

Extending from a side part of the blank 2 is the portion 6 which serves as the box opener 7. When made of card-board, this opener is integral with the remainder of the blank, as shown in Fig. 4. When the case is made of metal, the opener is suitably secured to a spring which serves as a spring 8 to close it when not in use, as shown in Fig. 6. The spring 8 may be of any desired construction, but a coiled wire spring has been found to be practical and cheap. The ends of the spring are extended and are shaped into supporting loops 9. The end of the opener 7 is cut on both sides as shown at 10 to provide shoulders, which may have metal reinforcements 25, and an intermediate tongue 11, described later. Upon assembling, the blank 2, Fig. 9, is folded at the seams 12, 12, and the edge 13 secured under the rear face 14 by cement, glue, staples, etc., in the case of card-board; or by soldering, welding, lock seam joint, etc., with a metal sheet, as in metal box making; the extended end 15 of the spacer 5 is also preferably secured between the edge 13 and rear face 14, the portion 5 serving to enclose, and act as a back stop to the opener 7.

After the case has been completed, a box of matches 16 of the kind that have the igniting composition 17 on the side, the so-called "safety matches," is inserted in the open end. For convenience in removing matches, a portion of the cover of the box 18 may be torn on both sides, as shown at 19 in Figs. 1 and 2. The matches are preferably inserted so that the "heads" will be toward the outer end. Upon pressing the opener 7, the tongue 11 engages the inner box of matches 21, while the shoulders 10 engage the sides of the cover 20, as shown in Fig. 1, and upon continued pressure, the box and cover are pressed out from the open end of the wind shield case, the inner box 21 extending beyond its cover 20 a distance sufficient to extract matches, as shown in Figs. 1 and 2, enlarged. The wind shield 1 engages the box cover 20 with about the same amount of friction as the box cover 20 engages the inner box 21. Upon releasing the pressure, the opener 7 is returned by the resiliency of the spring 8, leaving a space, or "flame chamber" 22 within the end of the shield, see Fig. 2.

In order to light a cigar on a windy day, the opener 7 is depressed to provide the flame chamber 22, and then released. A match is quickly drawn over the igniting composition 17 and at once inserted through slot 24 into the flame chamber 22, as shown in Fig. 2. The end of the cigar or cigarette is then presented to the burning match, and lighted in the ordinary manner. After lighting the match is withdrawn, and the box closed. The entire operation of striking the match and lighting a cigar takes so little time that the card-board does not char. The match box may then be pressed back into the wind shield cover.

While the preferred construction would include printed or advertising matter placed on the cover during the manufacture, it is obvious that it may be placed thereon at any time even after the completion of the article. The printed matter may be applied by pasting a label thereon, or marking with a rubber stamp. Also, with metal covers, the case may be engraved with coats of arms, monograms, or other personal matter.

I claim:

1. A wind shield for match boxes, comprising a casing for the box, an opening on the side of the shield to expose the igniting composition of the match box, a lighting aperture on one face of the shield, and a resiliently supported opener in one end of the shield, said opener provided with shoulders and a tongue.

2. A wind shield for match boxes, comprising a casing, for the box, a slotted opening on the side of said shield, an aperture on one face of the shield, an opener in one end of the shield, a resilient spring to support and close said opener, shoulders on said opener, a tongue on said opener, and an abutment to engage said opener and close the end of said shield.

3. A wind shield for match boxes comprising a casing for the box, an opening on one side of the shield to expose the igniting composition of the match box, said opening also constituting a space through which a lighted match may be inserted, an aperture on another side of the shield constituting a space through which a cigar may be lighted, a flame chamber within the box, an opener on one end of said shield, said opener having a tongue section, and a wider section, and shoulders between the sections.

4. A wind shield for match boxes comprising a casing for the box, an opening on one side of the shield to admit a lighted match, an aperture on another side to admit a cigar, a flame chamber, an opener, a tongue on said opener, and reinforced shoulders on said opener.

5. A wind shield for match boxes comprising a casing for the match box, an opener in one end of said shield constructed to force said match box down by pressure, means on said opener to simultaneously move the cover of the box and the box, and to move the box a greater distance than the cover, thereby opening the match box, and resilient means to close said opener upon removing the pressure.

6. A wind shield for match boxes comprising a casing for the match box, an opener in one end of said shield, a resilient spring engaging the opener and a side of the shield, said opener reinforced by a locked end of said spring, shoulders on said opener, reinforcements on said shoulders, and a tongue on said opener.

7. In a wind shield for match boxes, constructed to frictionally engage a match box, an opener, means on said opener to move the cover of the box and the box, and additional means to separately move the box a greater distance than its cover.

In testimony whereof I hereby affix my signature.

CHARLES R. WELSH.